United States Patent [19]

Mullen et al.

[11] Patent Number: 4,932,805

[45] Date of Patent: Jun. 12, 1990

[54] METHOD AND APPARATUS FOR ALIGNING AND MOUNTING MACHINE COMPONENTS

[75] Inventors: Charles E. Mullen, Spencerport; Arthur H. Crater, Warsaw, both of N.Y.

[73] Assignee: Eastman Kodak Company, Rochester, N.Y.

[21] Appl. No.: 382,362

[22] Filed: Jul. 20, 1989

Related U.S. Application Data

[62] Division of Ser. No. 225,498, Jul. 28, 1988, abandoned.

[51] Int. Cl.⁵ .............................................. B25G 3/00
[52] U.S. Cl. ................................... 403/13; 403/408.1; 411/82
[58] Field of Search ...................... 403/408.1, 3, 4, 13; 411/82, 258, 257, 539

[56] References Cited

U.S. PATENT DOCUMENTS

| 3,305,995 | 2/1967 | Armstrong et al. | 403/408.1 X |
| 3,532,316 | 10/1970 | Mathes | 411/82 X |
| 4,830,529 | 5/1969 | Bildtsen | 403/408.1 X |

*Primary Examiner*—Andrew V. Kundrat
*Attorney, Agent, or Firm*—Tallam I. Nguti

[57] ABSTRACT

A method and apparatus for aligning and mounting a machine component includes an aligning member with perforations, that is positioned and mounted over an aperture in a mounting portion or bracket of an aligned and removably mounted machine component, forming a cavity. An adhesive is introduced into this cavity through one of the perforations, permanently bonding the aligning member to the mounting portion or bracket, thereby enabling the component, thereafter, to be removed, serviced and simply remounted without further need of realignment. This method and apparatus are particularly useful for aligning and mounting components such as the copy sheet registration assembly of an electrostatographic copier or printer.

7 Claims, 2 Drawing Sheets

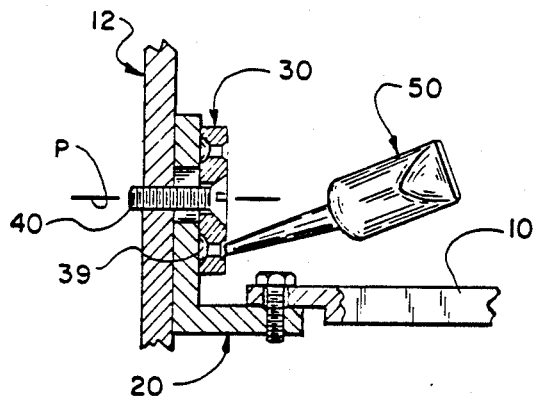
FIG.1
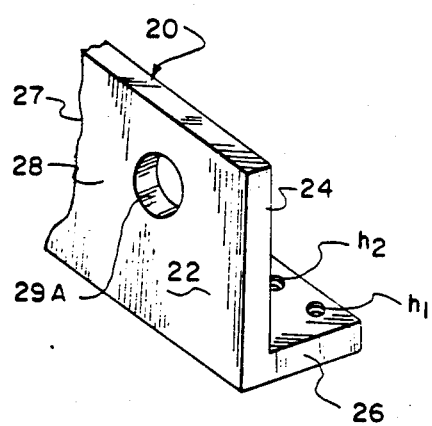
FIG.2A
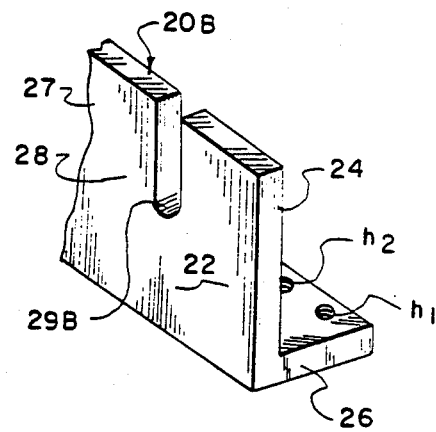
FIG.2B
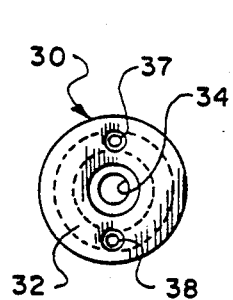
FIG.3A
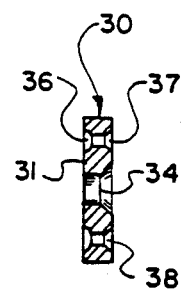
FIG.3B
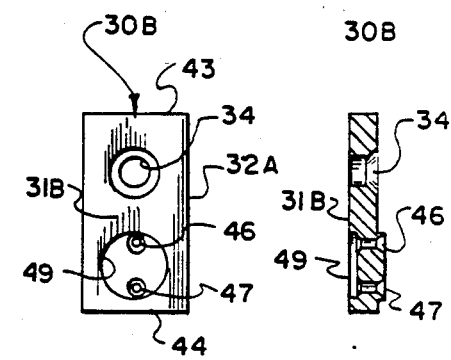
FIG.4A
FIG.4B

METHOD AND APPARATUS FOR ALIGNING AND MOUNTING MACHINE COMPONENTS

This is a divisional of application Ser. No. 07/225,498 filed July 28, 1988, now abandoned.

BACKGROUND OF THE INVENTION

This invention relates to the aligning and mounting of machine components, and more particularly, to a method and apparatus for aligning and mounting a component within a machine such that the component thereafter can be removed, serviced and simply remounted without further need of realignment.

In machines that have several operating components, the components usually have to be aligned with one another before being firmly mounted for proper operation. The reliability of such machines and the quality of their outputs, depend significantly on the continued alignment of such components, even after subsequent field service.

Conventional methods and apparatus for aligning and mounting such machine components include the use of two brackets each having a slotted end and a nonslotted end, and the initial step of firmly fastening the component to the slotted end of each such bracket. The component so fastened is then positioned in the machine in gross alignment, properly aligned by trial and error, and firmly mounted to the frame of the machine with mounting screws or other similar fasteners inserted through the slotted end of each of the brackets. Complementary components are also similarly fastened, placed in their respective operating positions within the machine, aligned by trial and error, and then firmly mounted to the frame of the machine.

In the field life of a machine, these types of components may be removed several times from the frame, serviced and then remounted within the machine for continued operation. In order to continue to operate reliably, precise realignment of the components is required after each such remounting. Unfortunately however, the trial and error approach for initially achieving such required precision is very troublesome and laborious, and is likely to become even more so with each subsequent removal, service and remounting of the components. It is therefore advantageous to be able to remove, service, and simply remount such components without further need of such trial and error realignment. Accordingly, methods and apparatus have been devised for eliminating the need to realign such components after they have been removed for service and then remounted.

One such method, for example, includes initially aligning and mounting the component by trial and error, then drilling at least four (4) close fitting holes through the machine frame and through the aligned and mounted portion or bracket carrying the component. Locating pins oF appropriate size and length are then inserted to fill the four holes and to removably retain the mounting portion or slotted bracket in an aligned position against the machine frame.

Drilling in this manner, however, is undesirable because it introduces metal chips and the risk of rust to parts of an already assembled machine. In addition, such drilling is expensive and is not always convenient or practical given the restricted mounting locations of some components within the machine. This method and apparatus also has an additional disadvantage in that the close fitting locating pins can become unreliable if knocked and bent out of their initial aligned shapes.

SUMMARY OF THE INVENTION

It is an object of the present invention to overcome these disadvantages and yet effectively allow for an aligned and firmly mounted component in a machine to be removed, serviced and simply remounted without further need for realignment.

In accordance with the present invention, an aligning member and a method are provided for aligning and mounting machine components in such a manner. The aligning member includes first and second sides with generally flat surfaces, a mounting hole, a recess in the surface of the first side, and at least two perforations located within the recess. The method includes the steps of (1) creating a cavity by positioning the aligning member against a mounting portion of the component or against a bracket fastened to the component, (2) inserting a mounting screw or other similar fastener, in gross alignment, through the aligning member, through the mounting portion or bracket, and into a support hole in a support frame, (3) precisely moving the component into an aligned position within the machine, (4) firmly fastening the aligning member and the mounting portion or bracket to the support frame in such aligned position using the mounting screw or other fastener, and (5) filling the cavity with an adhesive introduced through one of the perforations in the aligning member so as to permanently bond the aligning member to the mounting portion or bracket in such aligned position. So aligned and mounted, the component thereafter can be removed, serviced and simply remounted without further need for realignment.

BRIEF DESCRIPTION OF THE DRAWINGS

In the detailed description of the preferred embodiment of the invention presented below, reference is made to the accompanying drawings, in which:

FIG. 1 is a side sectional view showing a machine component mounted in an aligned position according to the present invention;

FIG. 2A is a perspective view of an alignment bracket equivalent to a mounting portion with a circular-type alignment aperture;

FIG. 2B is a perspective view of a similar bracket with a slot-type alignment aperture;

FIG. 3A is a front view of a disc-type aligning member;

FIG. 3B is a sectional view of the disc-type aligning member showing the recessed surface area with perforations therein;

FIG. 4A is a front view of a strip-type aligning member;

FIG. 4B is a sectional view of the strip-type aligning member showing a different arrangement of the mounting hole and recessed surface area;

DETAILED DESCRIPTION OF THE INVENTION

Figure 5:
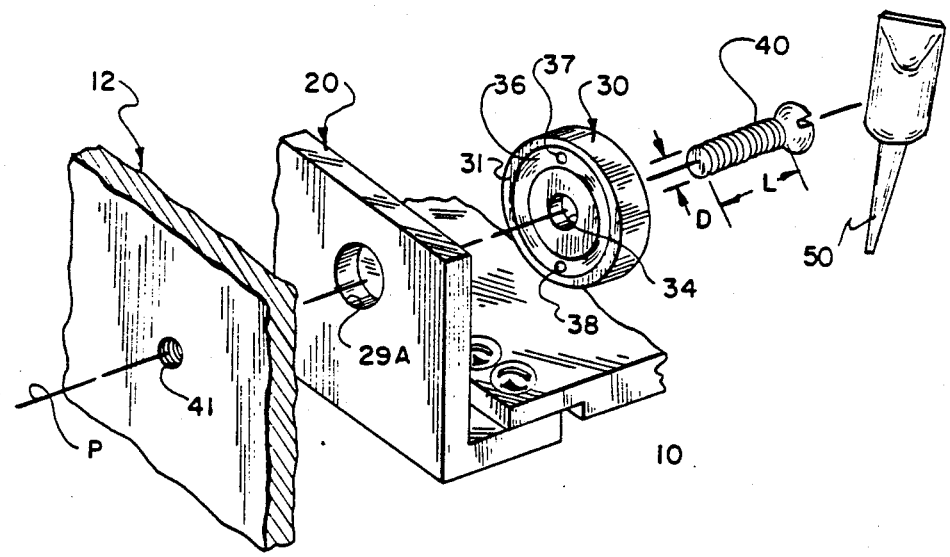
FIG. 5 is an exploded perspective view of components illustrating the method and apparatus of the present invention using a disc-type aligning member and an alignment bracket equivalent of a mounting portion having a circular alignment aperture.

According to FIG. 1, a machine component 10, is shown mounted in an aligned position P from which it can be removed, serviced, and simply remounted without further need for realignment. The component 10 is mounted to a support frame 12 utilizing a mounting portion or an alignment bracket 20, an aligning member 30 that forms a cavity 39 with the mounting portion or bracket 20, a mounting means such as a mounting screw 40, and an adhesive 50 for permanently bonding the aligning member to the mounting portion or bracket.

The component 10 may come with a mounting portion ready for mounting or it may be necessary to use the alignment bracket 20 to form such a mounting portion on the component. Alignment bracket 20 as best shown in FIG. 2A is selected so that it is strong and rigid enough to carry the component 10. Bracket 20 has flat and smooth front and rear surfaces 22, 24, and at least first and second ends 26, 27. The first end 26 may have a plurality of small mounting holes h1, h2 formed to closely fit fastening means used to fasten the component 10 to the bracket. The holes h1, h2 may also be formed by the fastening means during such fastening. The second end 27 has a surface area 28 through which is formed a mounting and alignment aperture 29A. The mounting and alignment aperture can also be the slot 29B in a slotted type mounting portion or bracket 20B as shown in FIG. 2B. Where the component 10 comes with a mounting portion in place of the bracket 20 or 20B, the surface area 28 and the alignment aperture 29A or 29B will accordingly be associated instead with such mounting portion.

FIGS. 3A and 3B show a disc-type aligning member 30 that is adapted for use with the bracket 20 or with an equivalent mounting portion. The disc 30 has rear and front sides 31, 32, and a mounting hole 34. The disc 30 is preferably made from a flat but strong piece of metal such as stainless steel and may have a circular or polygonal periphery. Its diameter must be substantially greater than the diameter of the aperture 29A. On the other hand, the diameter of the hole 34 must be smaller than that of the aperture 29A. The rear side 31 of the member 30 further includes a recessed surface area 36 suitable for forming a cavity 39 (FIG. 1) when cupped against the surface area 28 of the mounting portion or bracket 20. The recess 36 is shown, for example, as a groove that is spaced from, and that completely surrounds the mounting hole 34, but it may also assume other forms suitable for forming the cavity 39. The disc-type member 30 is used preferably with the circular alignment aperture in order to ensure a completely enclosed cavity. At least two perforations 37, 38 are formed within the recess 36 from the front 32 to the rear 31 so as to provide access to the cavity 39.

FIGS. 4A and 4B show a strip-type aligning member 30B that is to be used preferably with a slotted type mounting portion or equivalent bracket 20B such as that illustrated in FIG. 2B. The strip 30B has a flat smooth rear side 31B, and a front side 32B, as well as first and second ends 43, 44. Strip 30B can be made of a flat but strong piece of metal such as stainless steel but must be wider than, and longer than, the slot 29B over which it is to be mounted. The strip 30B also has a small mounting hole 34 that is formed in the first end 43 with a diameter that is less than the width of the slot 29B. The second end 44 has at least two perforations 46, 47 located within a recessed surface area 49 that is formed in the rear side 31B.

Referring to FIG. 5, a mounting means, such as a screw 40, is provided for mounting the member 30 and the mounting portion or bracket 20 to the machine frame 12. In order to obtain a tight and close fit with such means, the diameter of such means, for example the major diameter D of the screw 40, is made substantially equal to the diameter of the small mounting hole 34, and to the diameter of a support hole 41, predrilled for gross alignment, in the support frame 12. In addition, the length of the mounting means. such as the length L of the screw 40, is sufficient to pass through the aligning member and through the mounting portion or bracket 20, and still substantially penetrate the frame 12.

FIG. 5 also illustrates the adhesive 50 for permanently bonding the aligning member 30 to the mounting portion or bracket 20. The adhesive 50 may be any one of a variety of structural adhesives such as an acrylic or an epoxy type adhesive. Actually, the type selected may depend on the particular application, especially on the weight of the component being aligned, and on whether the orientations of the pieces being bonded are vertical or horizontal. If necessary, however, the type of adhesive selected may be thickened in order to prevent undesirable flow after application.

Referring again to the exploded view of FIG. 5, and to FIGS. 2 to 4, the method of the present invention for aligning and mounting a machine component 10 includes firmly fastening the component 10 to an alignment bracket 20 if the component comes without a mounting portion. An aligning member 30 that has a small mounting hole 34, a recessed surface area 36, and at least two perforations 37, 38, is positioned rearwards against the mounting portion or bracket 20. The aligning member is positioned such that the small mounting hole 34 is directly opposite the alignment aperture 29A, and such that the recessed surface area 36 in the aligning member forms a cavity 39 by cupping over the surface area 28 of the mounting portion or bracket 20. A removable mounting means such as a screw 40, that has a major diameter D substantially equal to the diameter of the small mounting hole 34, and to that of the support hole 41, is inserted through the hole 34, through the aperture 29A, and into the support hole 41, thereby supporting the component 10 in gross alignment against the frame 12. Supported as such, the component 10 can be moved for precise alignment in as many directions and as far as the alignment aperture 29A, of the mounting portion or bracket 20, is free to move about the fastening means or screw 40.

The component 10 is then precisely aligned within the machine by trial and error thereby moving the mounting portion or bracket 20 into an aligned position P with the holes 34 and 41. The screw 40 is then driven firmly into the hole 41 in the support frame 12 fastening the aligning member 30 in such aligned position P against the mounting portion or bracket 20 to form the cavity 39, and such mounting portion or bracket against the support frame 12. The adhesive 50 is thereafter introduced into the cavity 39 through one of the perforations 37 or 38, until the cavity is filled. The adhesive going in through one perforation forces air within the cavity out the other perforation. Any excess adhesive is wiped off and the quantity introduced into the cavity is allowed to cure, permanently bonding the aligning member 30 to the mounting portion or bracket 20 in such aligned position P. Precisely aligned and mounted as such, the component 10, thereafter, can be removed by removing the screw 40 or other similar fastener, serviced, and then simply remounted in the hole 41, in the aligned position P, without further need of realignment.

Figure 6:
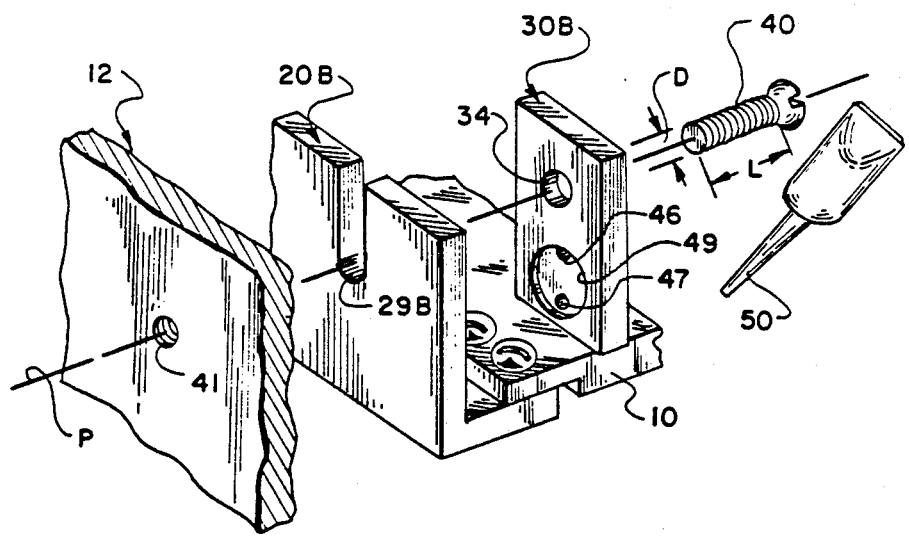
FIG. 6 is similar to FIG. 5 except that it utilizes a slotted bracket equivalent, and a strip-type aligning member.

The invention as described according to FIG. 5, can also be practiced as illustrated in FIG. 6 where a slotted type mounting portion or bracket is utilized. Accordingly, a slotted-end bracket 20B as shown in FIGS. 2B and 6, is substituted for bracket 20, and a strip-type aligning member 30B as shown in FIGS. 4A, 4B and 6, is substituted for the aligning member 30.

The present invention is particularly useful in electrostatographic reproduction equipment for aligning and mounting components such as a copy sheet registration assembly in such equipment.

Although the above detailed description has been made with particular reference to a preferred embodiment, it will be understood that variations and modifications can be effected within the spirit and scope of the invention.

What is claimed is:

1. An apparatus for aligning and mounting components in a machine such that the components thereafter can be removed, serviced and remounted without further need of realignment, the apparatus comprising:
   a. a support frame;
   b. a mounting portion of the component having a first surface area and an alignment aperture for mounting and varying the position of the component against said frame;
   c. an aligning member positioned in contact with said mounting portion, said aligning member having (1) a second surface area directly opposite and facing said first surface area of the mounting portion, (2) a recess in said second surface area, (3) at least two perforations located within said recess, and (4) a mounting hole therein directly facing said alignment aperture in the mounting portion of the component;
   d. a cavity formed between said first surface area of the mounting portion and said second surface area of the aligning member by said recess in the aligning member;
   e. mounting means having a major diameter, said mounting means being insertable through the mounting hole in the aligning member and through said alignment aperture in the mounting portion, for firmly and removably mounting the component to said support frame in an aligned position; and
   f. an adhesive introduced into said cavity through one of said perforations for permanently bonding the aligning member to the mounting portion in said aligned position.

2. The apparatus as set forth in claim 1 wherein said mounting portion of the component is a bracket fastened to the component.

3. The invention as set forth in claim 1 wherein said mounting hole in the aligning member is substantially the same size as said major diameter of the mounting means in order to form a close fit for precise alignment.

4. The apparatus as set forth in claim 1 wherein said alignment aperture in the mounting portion is substantially larger than said major diameter of the mounting means.

5. The apparatus as set forth in claim 1 wherein said recess is formed instead in said first surface area of the mounting portion.

6. The apparatus as set forth in claim 1 wherein said mounting means is a self-threading screw.

7. The invention as set forth in claim 1 including a plurality of said aligning members.

* * * * *

UNITED STATES PATENT OFFICE
CERTIFICATE OF CORRECTION

Patent No. 4,932,805                Dated June 12, 1990

Inventor(s) Charles E. Mullen & Arthur H. Crater

It is certified that error appears in the above-identified patent and that said Letters Patent is hereby corrected as shown below:

COLUMN AND LINE
PRINTED PATENT

MISTAKE
NOTED

Cover page,
line 62, after
"Jul, 28, 1988"

"abandoned"
should be
deleted

Signed and Sealed this

Twelfth Day of May, 1992

Attest:

DOUGLAS B. COMER

Attesting Officer         Acting Commissioner of Patents and Trademarks